(12) United States Patent
Ozaki

(10) Patent No.: US 6,778,329 B2
(45) Date of Patent: Aug. 17, 2004

(54) ZOOM LENS SYSTEM

(75) Inventor: Hiroyasu Ozaki, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/431,465

(22) Filed: May 8, 2003

(65) Prior Publication Data

US 2003/0214705 A1 Nov. 20, 2003

(30) Foreign Application Priority Data

May 9, 2002 (JP) ........................................ 2002-133452

(51) Int. Cl.$^7$ .............................................. G02B 15/14
(52) U.S. Cl. ........................ 359/684; 359/690; 359/689
(58) Field of Search ................................ 359/684, 687, 359/689, 690

(56) References Cited

U.S. PATENT DOCUMENTS

| | | | |
|---|---|---|---|
| 4,848,883 A | 7/1989 | Maruyama | 359/684 |
| 5,347,399 A | 9/1994 | Yoneyama et al. | 359/690 |
| 5,448,412 A | 9/1995 | Maruyama et al. | 359/687 |
| 5,572,276 A | 11/1996 | Hirakawa | 359/684 |
| 5,760,967 A * | 6/1998 | Terasawa et al. | 359/684 |
| 5,889,619 A | 3/1999 | Ozaki et al. | 359/688 |
| 5,912,771 A | 6/1999 | Ozaki et al. | 359/690 |
| 6,307,685 B1 * | 10/2001 | Mori et al. | 359/690 |
| 6,333,823 B1 | 12/2001 | Ozaki et al. | 359/690 |
| 6,344,931 B1 | 2/2002 | Minefuji | 359/684 |
| 6,397,009 B1 | 5/2002 | Ito et al. | 396/79 |
| 2003/0223122 A1 * | 12/2003 | Ozaki | 359/676 |

* cited by examiner

Primary Examiner—David N. Spector
(74) Attorney, Agent, or Firm—Greenblum & Bernstein, P.L.C.

(57) ABSTRACT

A zoom lens system includes a positive first lens group, a negative second lens group, and a positive third lens group, in this order from the object. Upon zooming from the short focal length extremity to the long focal length extremity, the positive first lens group remains stationary, the negative second lens group moves toward the image, and the positive third lens group moves toward the object. The positive first lens group includes a first sub-lens group which is stationary and a second sub-lens group which functions as a focusing lens group.

6 Claims, 7 Drawing Sheets

Fig. 1
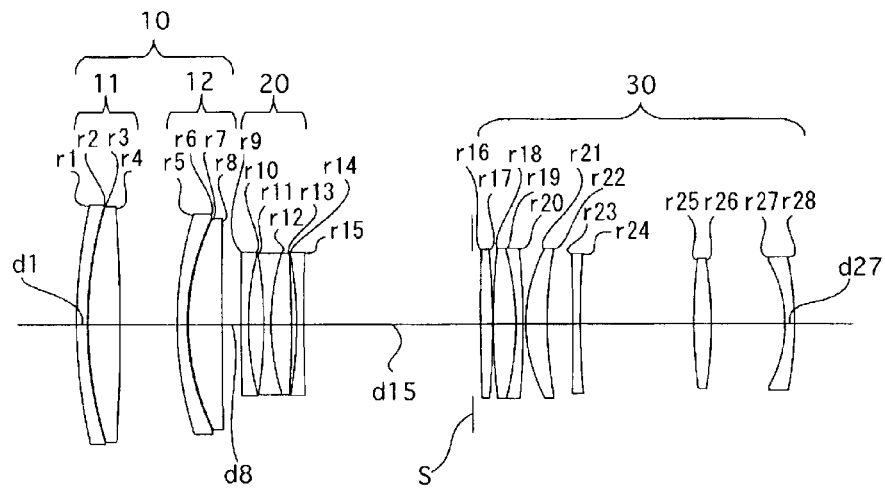
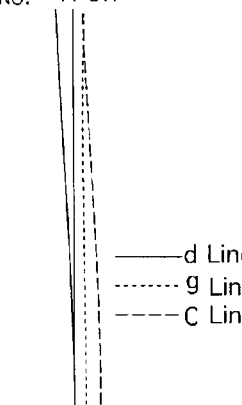
Fig. 2A
F$_{NO.}$ =1: 5.7
—— d Line
······ g Line
- - - C Line
-0.3  0.3
SPHERICAL
ABERRATION
CHROMATIC
ABERRATION
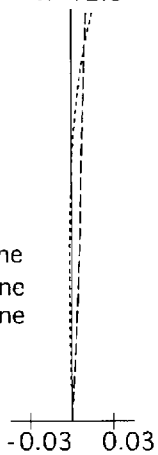
Fig. 2B
W=12.8°
-0.03  0.03
LATERAL
CHROMATIC
ABERRATION
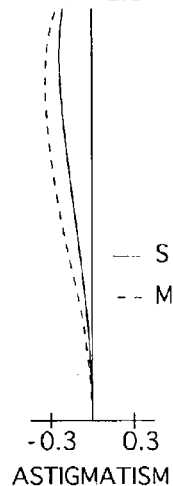
Fig. 2C
W=12.8°
—— S
- - M
-0.3  0.3
ASTIGMATISM
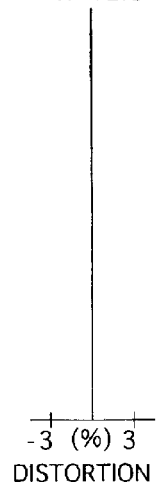
Fig. 2D
W=12.8°
-3 (%) 3
DISTORTION

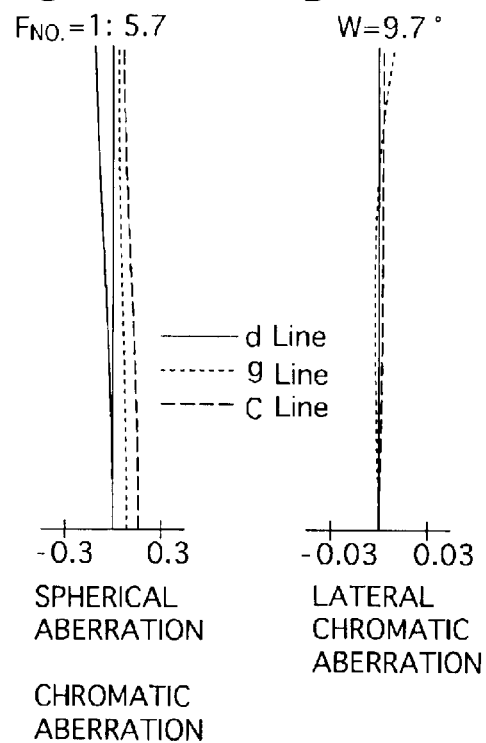
Fig. 3A  F_{NO.}=1:5.7  SPHERICAL ABERRATION CHROMATIC ABERRATION
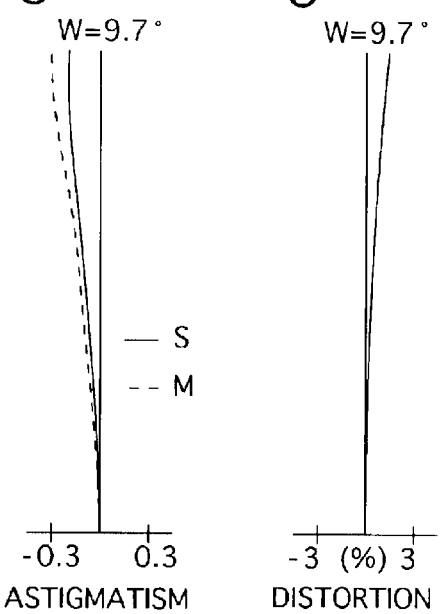
Fig. 3B W=9.7° LATERAL CHROMATIC ABERRATION
Fig. 3C W=9.7° ASTIGMATISM
Fig. 3D W=9.7° DISTORTION
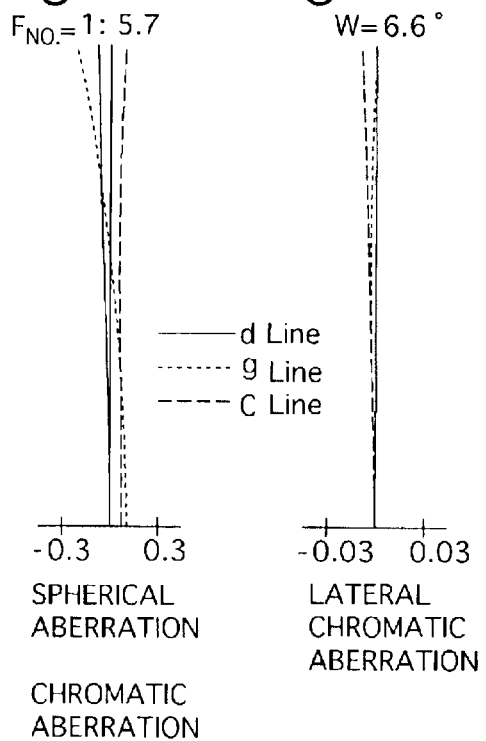
Fig. 4A F_{NO.}=1:5.7 SPHERICAL ABERRATION CHROMATIC ABERRATION
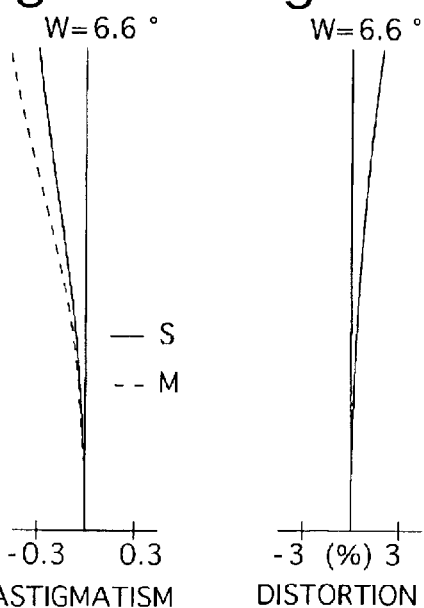
Fig. 4B W=6.6° LATERAL CHROMATIC ABERRATION
Fig. 4C W=6.6° ASTIGMATISM
Fig. 4D W=6.6° DISTORTION F$_{NO.}$=1: 5.7
—— d Line
······· g Line
- - - - C Line
-0.3    0.3
SPHERICAL
ABERRATION

CHROMATIC
ABERRATION

W=12.9°
-0.03   0.03
LATERAL
CHROMATIC
ABERRATION

W=12.9°
—— S
- - M
-0.3    0.3
ASTIGMATISM

W=12.9°
-3  (%)  3
DISTORTION

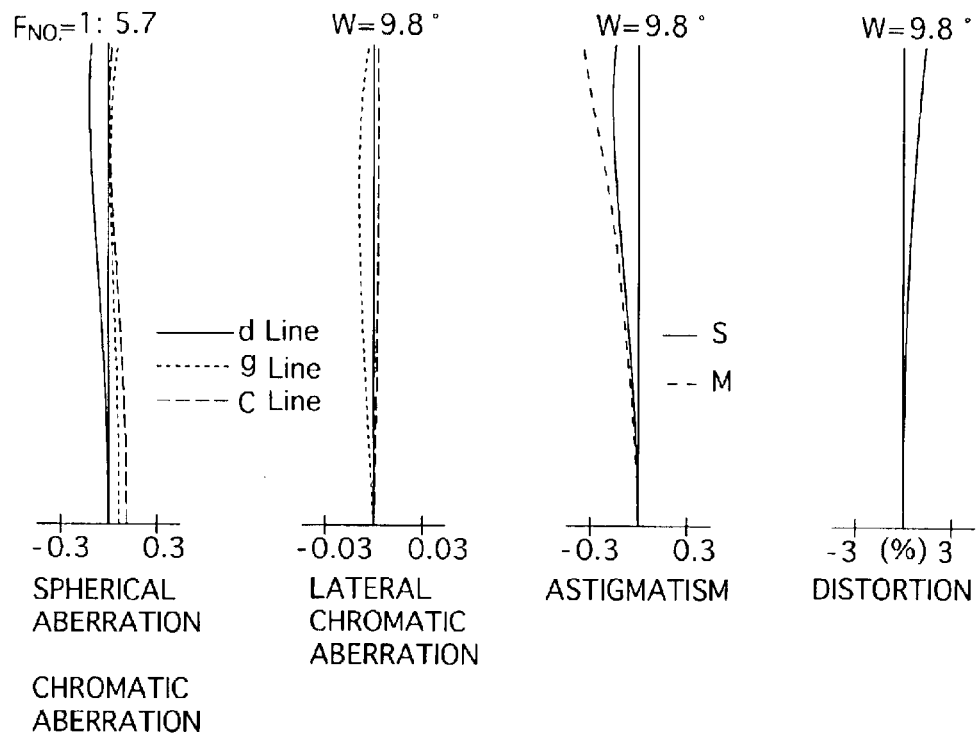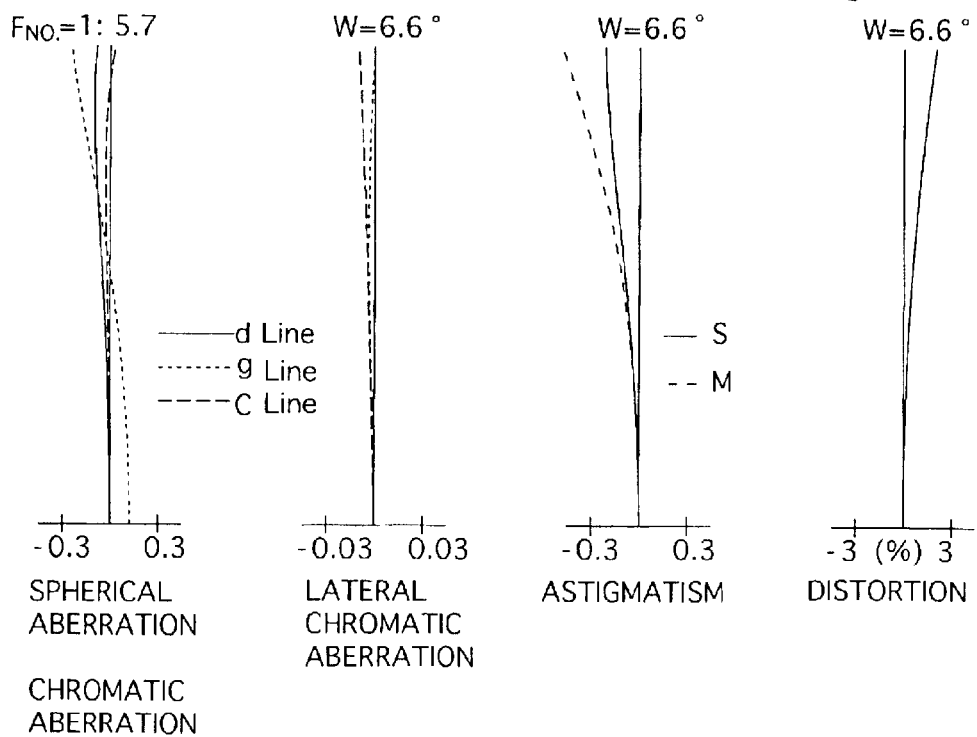

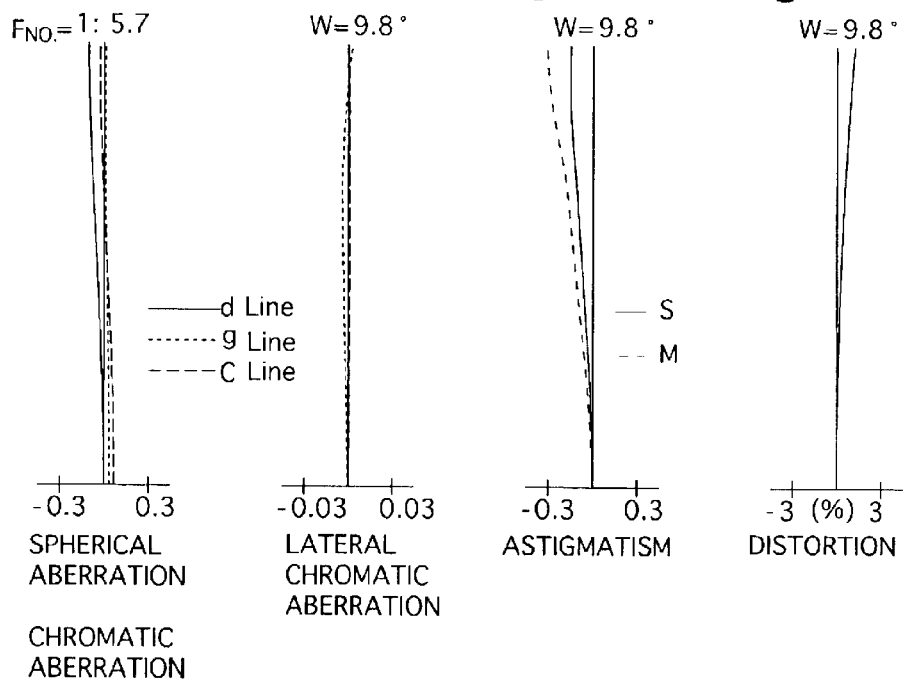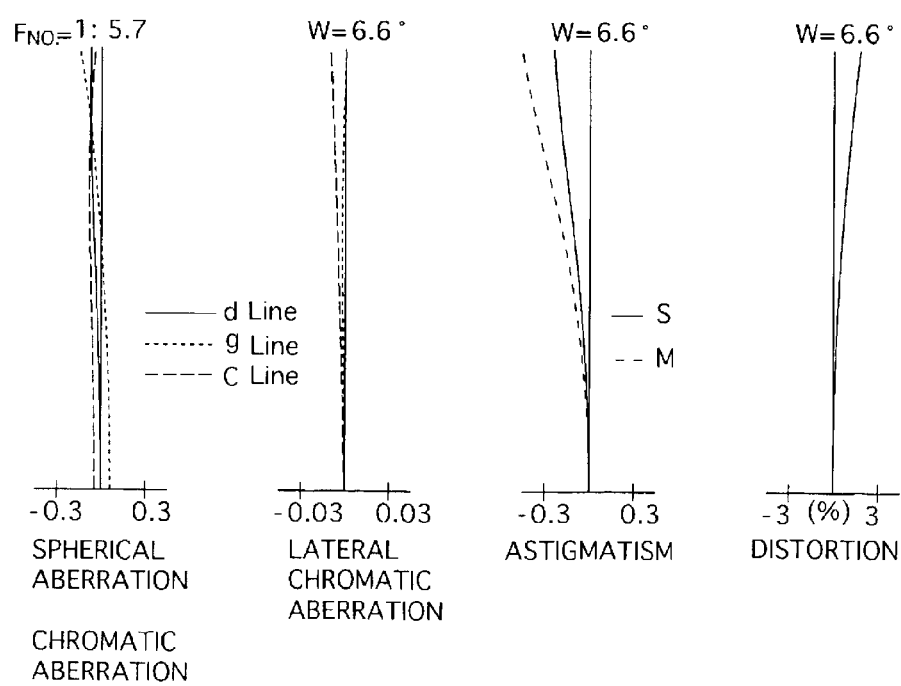

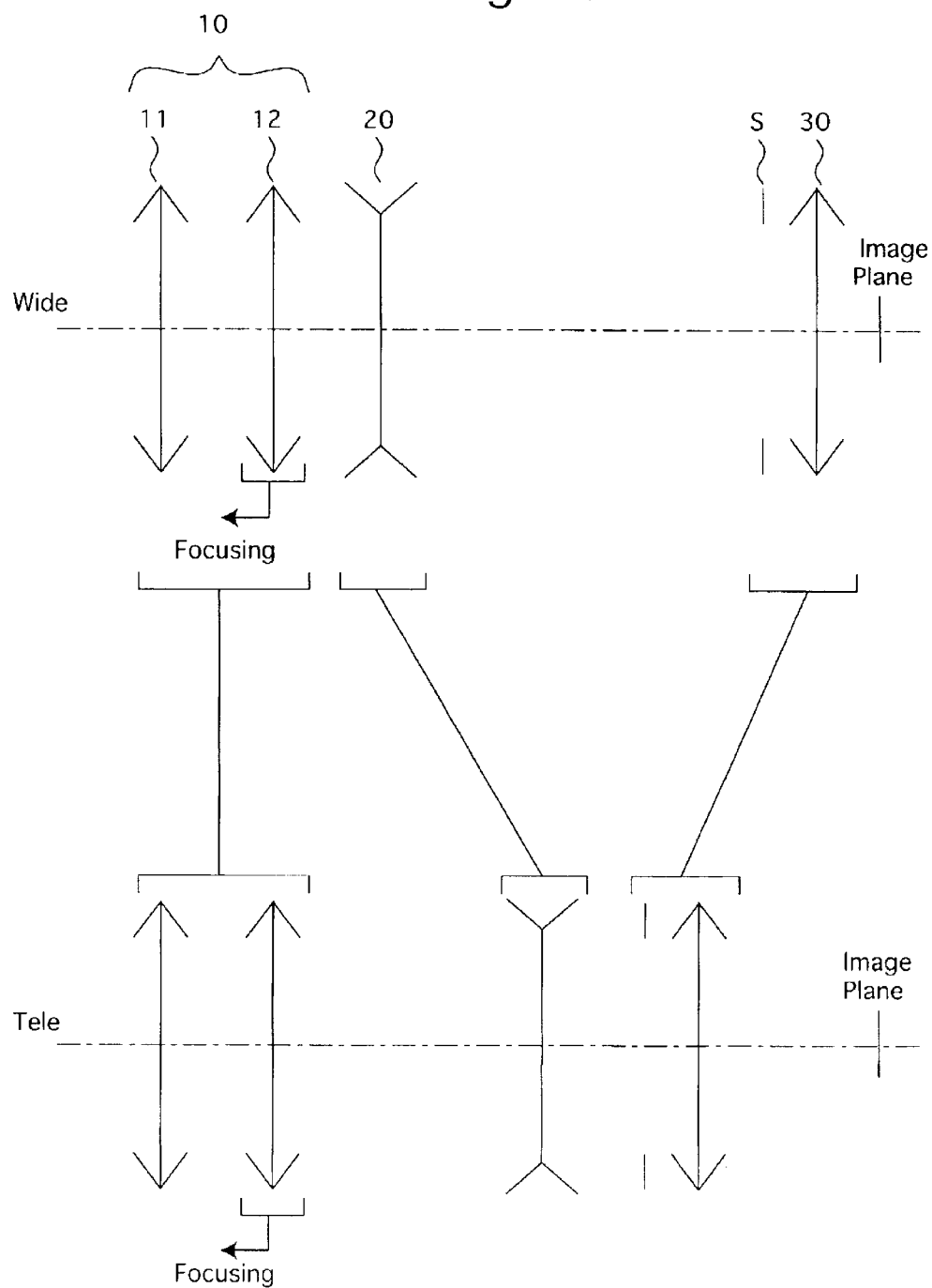

ZOOM LENS SYSTEM

BACKGROUND OF THE INVENTION

1. Field of the Invention

The present invention relates to a telescopic zoom lens system with a zoom ratio of approximately 2, for use in a single lens reflex camera which has a long back focal distance, and does not change the overall length of the zoom lens system upon both zooming and focusing.

2. Description of the Prior Art

As an example of a zoom lens system in which the overall length thereof does not change upon zooming, there is known, for example, a four-lens-group zoom lens system having either a positive-negative-positive-positive arrangement or a positive-negative-negative-positive arrangement, in this order from the object. With this arrangement, the first and fourth lens groups remain stationary while the second and third lens groups are moved upon zooming.

However, it is difficult to achieve a compact zoom lens system in a four-lens-group arrangement. If the overall length of the zoom lens system is shortened without considering an optical balance among optical elements therein, the optical power (hereinafter, power) of each lens group has to be made stronger, so that the correcting of aberrations becomes difficult.

Furthermore, the entire first lens group is generally used for focusing. However, since the entire first lens group has a large diameter and the weight thereof is heavy, such a zoom lens system is not suitable for an autofocus (AF) camera. Moreover, if the entire first lens group constitutes a focusing lens group, spherical aberration, at a closer distance, tends to occur in the negative direction.

SUMMARY OF THE INVENTION

The present invention provides a zoom lens system for use in a single lens reflex camera which does not change the overall length of the zoom lens system upon both zooming and focusing, and which is compact and has a high optical performance.

According to an aspect of the present invention, there is provided a zoom lens system including a positive first lens group, a negative second lens group, and a positive third lens group, in this order from the object. Upon zooming from the short focal length extremity to the long focal length extremity, the positive first lens group remains stationary, the negative second lens group moves toward the image, and the positive third lens group moves toward the object. The positive first lens group includes a first sub-lens group which is stationary and a second sub-lens group which functions as a focusing lens group.

Due to the above arrangement, the positive first lens group is made stationary when zooming is performed; and focusing is carried out by moving the second sub-lens group which is positioned behind the first sub-lens group. Consequently, the zoom lens system does not change the overall length thereof upon both zooming and focusing, and aberrations which occur at a close-distance photographing can be reduced. Furthermore, the zoom lens system is suitable for an AF operation, since the weight of the focusing lens group can be made lighter.

The zoom lens system preferably satisfies the following conditions:

$$1 < |m2W| \qquad (1)$$

$$1 < |m3W| \qquad (2)$$

$$1 < Z2/Z3 < 2 \qquad (3)$$

wherein m2W designates the lateral magnification of the negative second lens group at the short focal length extremity;

m3W designates the lateral magnification of the positive third lens group at the short focal length extremity;

Z2 designates the ratio (m2T/m2W) of the lateral magnification (m2T) of the negative second lens group at the long focal length extremity to the lateral magnification (m2W) of the negative second lens group at the short focal length extremity; and Z3 designates the ratio (m3T/m3W) of the lateral magnification (m3T) of the positive third lens group at the long focal length extremity to the lateral magnification (m3W) of the positive third lens group at the short focal length extremity.

The zoom lens system can satisfy the following conditions:

$$1.0 < fw/f1 < 2.0 \qquad (4)$$

$$0.5 < fw/f1a < 1.0 \qquad (5)$$

wherein fw designates the focal length of the entire the zoom lens system at the short focal length extremity;

f1 designates the focal length of the positive first lens group; and f1a designates the focal length of the first sub-lens group.

The zoom lens system preferably satisfies the following condition:

$$0.05 < L1a/f1 < 0.15 \qquad (6)$$

wherein

L1a designates the distance between the first sub-lens group and the second sub-lens group when an object at an infinite distance is in an in-focus state.

The first sub-lens group can include a negative lens element and a positive lens element, in this order from the object. The second sub-lens group can include a negative lens element and a positive lens element, in this order from the object.

Each of the two positive lens elements in the positive first lens group is preferably made of a glass material having the Abbe number of more than 75.

The present disclosure relates to subject matter contained in Japanese Patent Application No. 2002-133452 (filed on May 9, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system, at the short focal length extremity, according to a first embodiment of the present invention;

FIGS. 2A, 2B, 2C and 2D show aberrations occurred in the lens arrangement shown in FIG. 1;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity; and FIG. 13 shows a schematic lens-group moving paths of the zoom lens system according to the present invention.

DESCRIPTION OF THE PREFERRED EMBODIMENTS

Figure 5:
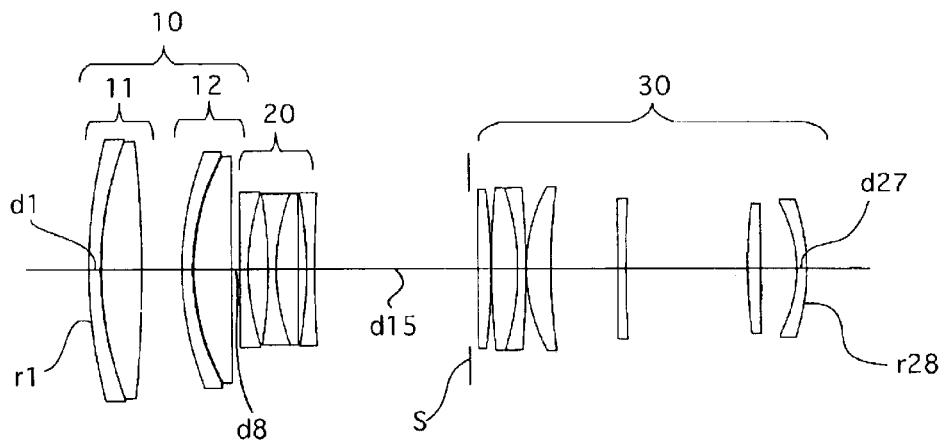
FIG. 5 is a lens arrangement of a zoom lens system, at the short focal length extremity, according to a second embodiment of the present invention.
Figure 6A:
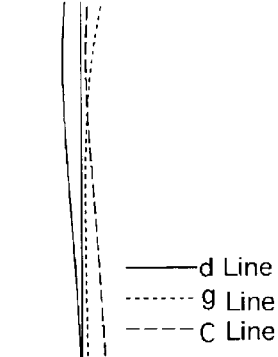
FIGS. 6A, 6B, 6C and 6D show aberrations occurred in the lens arrangement shown in FIG. 5.
Figure 6B:
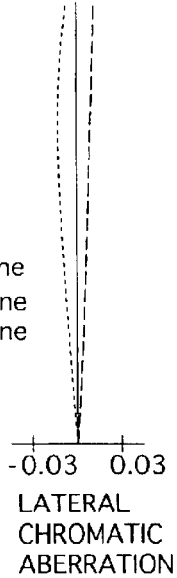
Figure 6C:
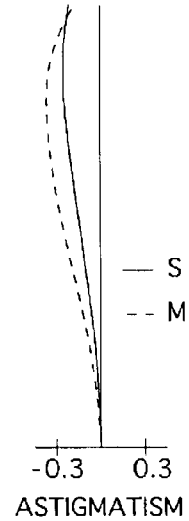
Figure 6D:
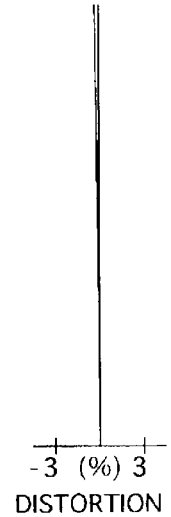

A zoom lens system according to the present invention includes, as shown in the lens-group moving paths of FIG. 13, a positive first lens group 10, a negative second lens group 20, and a positive third lens group 30, in this order from the object.

Upon zooming from the short focal length extremity to the long focal length extremity, the positive first lens group 10 remains stationary, the negative second lens group 20 moves toward the image, and the positive third lens group 30 moves toward the object.

A diaphragm S is provided between the negative second lens group 20 and the positive third lens group 30, and moves together with the positive third lens group 30.

Furthermore, the positive first lens group 10 includes a first sub-lens group 11 which is stationary, and a second sub-lens group 12 which functions as a focusing lens group, in this order from the object. Focusing from infinity to a closer distance is carried out by moving the second sub-lens group 12 toward the object. The first sub-lens group 11 and the second sub-lens group 12 have a positive power, respectively.

In the zoom lens system having the above-described arrangement, the overall length of the zoom lens system remains constant upon both zooming and focusing. Therefore the zoom lens system can be made more compact, compared with a zoom lens system of a four-lens-group arrangement. Furthermore, according to the zoom lens system of the present invention, the change in the center-of-gravity of the zoom lens system is minimal upon zooming and focusing, so that the front portion of the zoom lens system can be prevented from unnecessary colliding with any obstacles. The second sub-lens group 12, provided behind the first sub-lens group 11, is exclusively used as a focusing lens group, without using the entire positive first lens group 10 for the same purpose. Consequently, a focusing lens group can be made lighter in weight, and has a high optical performance when focusing at a closer distance is carried out.

In the zoom lens system according to the present invention, by satisfying conditions (1), (2) and (3), the lateral magnification of the negative second lens group 20 and that of the positive third lens group 30 can be adequately determined; and the ratio (m2T/m2W) of the lateral magnification (m2T) of the negative second lens group at the long focal length extremity to the lateral magnification (m2W) of the negative second lens group at the short focal length extremity can be suitably determined, and the ratio (m3T/m3W) of the lateral magnification (m3T) of the positive third lens group at the long focal length extremity to the lateral magnification (m3W) of the positive third lens group at the short focal length extremity can be suitably determined. As a result, the entire zoom lens system can be made compact.

Conditions (1) and (2) specify the lateral magnifications of the negative second lens group 20 and the positive third lens group 30, respectively. Conditions (1) and (2) indicate that the absolute value of the lateral magnification of the negative second lens group 20 and the positive third lens group 30 is greater than 1 over the entire zooming range. By determining the lateral magnification according to conditions (1) and (2), zooming function can effectively be distributed over the negative second lens group 20 and the positive third lens group 30. Furthermore, since a magnification of 1:1 never occurs in the negative second lens group 20, the moving direction of the positive third lens group 30 upon zooming does not change to a reverse direction. Accordingly, it is mechanically possible to move the positive third lens group 30 smoothly upon zooming.

If conditions (1) and (2) are not satisfied, the traveling distances of the negative second group 20 and the positive third lens group 30 are made longer upon zooming, so that the overall length of the zoom lens system is increased.

Condition (3) is for distributing zooming function over the negative second lens group 20 and the positive third lens group 30 with an appropriate ratio.

If Z2/Z3 exceeds the lower limit of condition (3), burden of zooming to the positive third lens group 30 becomes excessively larger. As a result, the traveling distance of the positive third lens group 30 upon zooming becomes longer, so that it becomes difficult to make the overall length of the zoom lens system shorter.

If Z2/Z3 exceeds the upper limit of condition (3), burden of zooming to the negative second lens group 20 becomes excessively larger. As a result, the power of the negative second lens group 20 becomes too strong, so that aberrations, such as coma and astigmatism or the like, which occur in the negative second lens group 20 become larger; or, the traveling distance of the negative second lens group 20 becomes longer, so that the entire length of the zoom lens system cannot be made shorter.

Conditions (4) and (5) are for performing focusing by the second sub-lens group 12 which is a part of the positive first lens group 10. The focusing sensitivity of the second sub-lens group 12 is indicated as the difference between $(fw/f1)^2$ and $(fw/f1a)^2$.

Condition (4) specifies the relationship between the focal length of the positive first lens group 10 and the focal length of the entire zoom lens system.

If fw/f1 exceeds the lower limit of condition (4), the power of the positive first lens group 10 becomes too weak, so that the overall length of the zoom lens system becomes longer. Consequently, a compact zoom lens system cannot be achieved.

If fw/f1 exceeds the upper limit of condition (4), the power of the positive first lens group 10 becomes too strong. As a result, higher-order aberrations occur, and the correcting thereof becomes practically difficult.

Condition (5) specifies the relationship between the focal length of the first sub-lens group 11 and the focal length of the entire zoom lens system.

If fw/f1a exceeds the lower limit of condition (5), the power of the first sub-lens group 11 becomes too weak. Consequently, the position of a light ray incident on the second sub-lens group 12 becomes higher, so that the lens diameter of the second sub-lens group 12 becomes larger.

If fw/f1a exceeds the upper limit of condition (5), the power of the first sub-lens group 11 becomes too strong, so that the power of the second sub-lens group 12 becomes relatively weaker. As a result, the focusing sensitivity of the second sub-lens group 12 becomes excessively small, so that the traveling distance of the second sub-lens group 12 upon focusing becomes longer.

Condition (6) specifies the distance between the first sub-lens group 11 and the second sub-lens group 12 in order to perform focusing an object at an infinite distance to an object at a closer distance by the second sub-lens group 12.

If L1a/f1 exceeds the lower limit of condition (6), the distance between the first sub-lens group 11 and the second sub-lens group 12 becomes too short, so that focusing up to a closer distance cannot be sufficiently carried out.

If L1a/f1 exceeds the upper limit of condition (6), the distance between the first sub-lens group 11 and the second sub-lens group 12 becomes too long, so that the overall length of the zoom lens system becomes longer, and the amount of peripheral illumination decreases due to an elongation of the zoom lens system.

Both the first sub-lens group 11 and the second sub-lens group 12 preferably include a negative lens element and a positive lens element, in this order from the object. In order to obtain adequate optical performance over the entire zoom lens system, it is desirable to carry out the correcting of aberrations within each lens group. More specifically, spherical aberration and chromatic aberration or the like can be corrected by combining a negative lens element with a positive lens element. The larger the number of lens elements in each lens group is, the more advantageous the correcting of aberrations can be made. However, the overall length and the weight of the zoom lens system are increased due to an increase in the number of lens elements.

By utilizing a glass material having the Abbe number of more than 75 for the positive lens elements in the positive first lens group 10, chromatic aberration can be adequately corrected.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $v_d$ designates the Abbe number.

[Embodiment 1]

FIG. 1 is the lens arrangement of a zoom lens system, at the short focal length extremity, according to the first embodiment of the present invention. FIGS. 2A through 2D show aberrations occurred in the lens arrangement shown in FIG. 1. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment. Surface Nos. 1 through 8 constitute the positive first lens group 10, surface Nos. 9 through 15 constitute the negative second lens group 20, and surface Nos. 16 through 28 constitute the positive third lens group 30. The first sub-lens group 11 includes a negative lens element and a positive element, in this order from the object. The second sub-lens group 12 includes a negative lens element and a positive lens element, in this order from the object. The diaphragm S is provided 2.00 in front of surface No. 16.

TABLE 1

FNO = 1:5.7–5.7–5.7
f = 152.91–200.00–294.00 (Zoom Ratio: 1.92)
W = 12.8–9.7–6.6
fB = 90.69–97.59–113.20

| Surf. No. | r | d | Nd | $v_d$ |
|---|---|---|---|---|
| 1 | 132.567 | 2.60 | 1.72825 | 28.5 |
| 2 | 101.001 | 0.20 | — | — |
| 3 | 102.442 | 7.78 | 1.49700 | 81.6 |
| 4 | −455.020 | 13.75 | — | — |
| 5 | 93.210 | 2.40 | 1.62588 | 35.7 |
| 6 | 59.489 | 0.27 | — | — |
| 7 | 59.954 | 8.11 | 1.49700 | 81.6 |
| 8 | 1219.994 | 4.55–12.77–20.76 | — | — |
| 9 | 662.798 | 1.80 | 1.69350 | 53.2 |
| 10 | 68.719 | 3.73 | — | — |
| 11 | −113.449 | 1.80 | 1.67790 | 55.3 |
| 12 | 60.403 | 4.86 | 1.80518 | 25.4 |
| 13 | −318.105 | 1.25 | — | — |
| 14 | −100.330 | 1.80 | 1.77250 | 49.6 |
| 15 | 580.386 | 42.74–27.61–4.02 | — | — |
| 16 | 742.799 | 2.88 | 1.69680 | 55.5 |
| 17 | −197.523 | 0.10 | — | — |
| 18 | 166.711 | 5.42 | 1.51633 | 64.1 |
| 19 | −74.997 | 1.80 | 1.80518 | 25.4 |
| 20 | −192.798 | 0.62 | — | — |
| 21 | 39.454 | 5.20 | 1.48749 | 70.2 |
| 22 | 106.117 | 6.19 | — | — |
| 23 | −537.502 | 1.80 | 1.80518 | 25.4 |
| 24 | 239.534 | 27.25 | — | — |
| 25 | 136.649 | 4.20 | 1.60342 | 38.0 |
| 26 | −103.545 | 17.76 | — | — |
| 27 | −32.608 | 2.20 | 1.69680 | 55.5 |
| 28 | −88.750 | — | — | — |

[Embodiment 2]

FIG. 5 is the lens arrangement of a zoom lens system, at the short focal length extremity, according to the second embodiment of the present invention. FIGS. 6A through 6D show aberrations occurred in the lens arrangement shown in FIG. 5. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment. The basic lens arrangement is the same as that of the first embodiment. The diaphragm S is provided 2.00 in front of surface No. 16.

TABLE 2

FNO = 1:5.7–5.7–5.7
f = 152.90–200.00–294.00 (Zoom Ratio: 1.92)
W = 12.9–9.8–6.6
fB = 103.9–108.24–121.46

| Surf. No. | r | d | Nd | $v_d$ |
|---|---|---|---|---|
| 1 | 122.865 | 2.60 | 1.66680 | 33.0 |
| 2 | 81.000 | 0.20 | — | — |
| 3 | 84.918 | 9.11 | 1.49700 | 81.6 |
| 4 | −309.662 | 9.12 | — | — |
| 5 | 75.041 | 2.40 | 1.67270 | 32.1 |
| 6 | 55.192 | 0.31 | — | — |
| 7 | 55.947 | 8.47 | 1.49700 | 81.6 |
| 8 | 3397.440 | 2.00–9.97–17.29 | — | — |
| 9 | −2677.906 | 1.80 | 1.65844 | 50.9 |
| 10 | 55.106 | 4.51 | — | — |
| 11 | −106.761 | 1.80 | 1.60311 | 60.7 |
| 12 | 48.831 | 5.10 | 1.80518 | 25.4 |
| 13 | −1018.765 | 1.84 | — | — |
| 14 | −96.587 | 1.80 | 1.77250 | 49.6 |
| 15 | 304.686 | 36.88–24.58–4.03 | — | — |
| 16 | 2250.387 | 2.89 | 1.58913 | 61.2 |
| 17 | −147.496 | 0.10 | — | — |
| 18 | 179.118 | 5.96 | 1.51633 | 64.1 |
| 19 | −60.468 | 1.80 | 1.74077 | 27.8 |
| 20 | −211.101 | 0.10 | — | — |
| 21 | 39.091 | 5.65 | 1.48749 | 70.2 |
| 22 | 151.744 | 15.05 | — | — |
| 23 | −4743.008 | 1.80 | 1.80518 | 25.4 |
| 24 | 300.763 | 27.44 | — | — |
| 25 | 130.315 | 3.00 | 1.80518 | 25.4 |
| 26 | −778.634 | 8.13 | — | — |
| 27 | −31.387 | 2.20 | 1.83400 | 37.2 |
| 28 | −50.632 | — | — | — |

[Embodiment 3]

Figure 9:
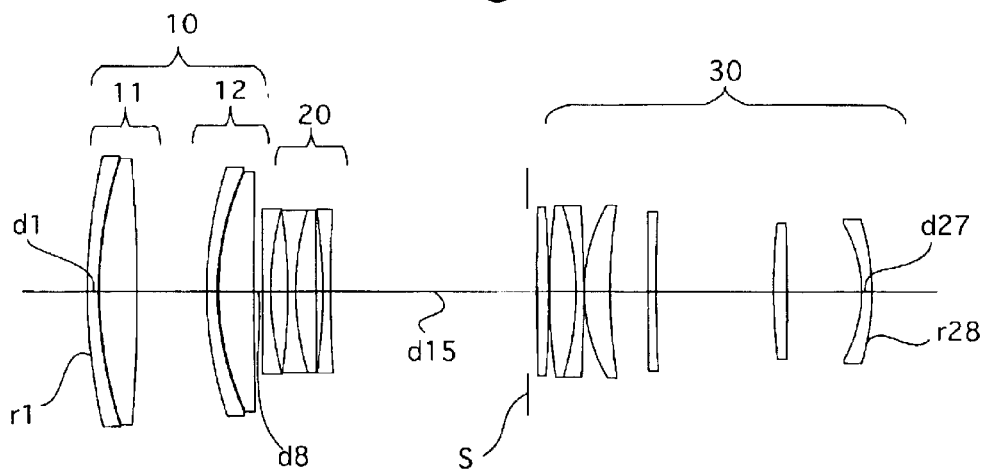
FIG. 9 is a lens arrangement of a zoom lens system, at the short focal length extremity, according to a third embodiment of the present invention.
Figures 10A, 10B, 10C, 10D:
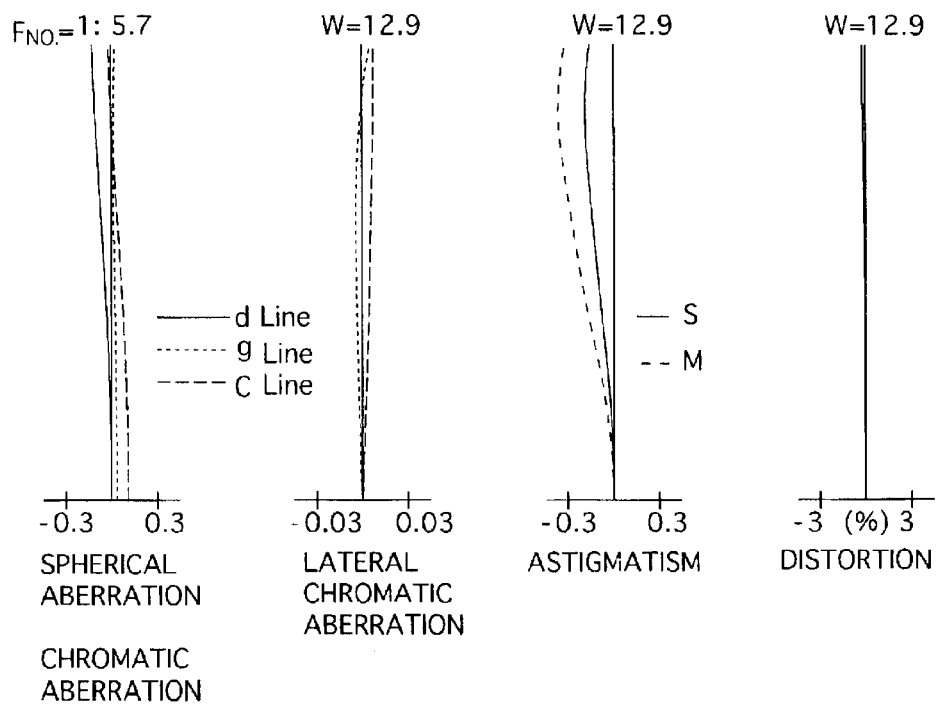
FIGS. 10A, 10B, 10C and 10D show aberrations occurred in the lens arrangement shown in FIG. 9.

FIG. 9 is the lens arrangement of a zoom lens system, at the short focal length extremity, according to the third embodiment of the present invention. FIGS. 10A through 10D show aberrations occurred in the lens arrangement shown in FIG. 9. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical data of the third embodiment. The basic lens arrangement is the same as that of the first embodiment. The diaphragm S is provided 2.00 in front of surface No. 16.

TABLE 3

FNO = 1:5.7–5.7–5.7
f = 152.93–200.00–294.00 (Zoom Ratio: 1.92)
W = 12.9–9.8–6.6
fB = 91.44–100.18–116.94

| Surf. No. | r | d | Nd | $v_d$ |
|---|---|---|---|---|
| 1 | 132.084 | 2.50 | 1.71736 | 29.5 |
| 2 | 96.856 | 0.20 | — | — |
| 3 | 98.019 | 8.18 | 1.49700 | 81.6 |
| 4 | −375.750 | 15.30 | — | — |
| 5 | 88.770 | 2.30 | 1.63636 | 35.4 |
| 6 | 63.913 | 0.28 | — | — |
| 7 | 64.600 | 7.64 | 1.43875 | 95.0 |
| 8 | 1213.586 | 2.00–9.58–17.68 | — | — |
| 9 | −1615.145 | 1.70 | 1.58313 | 59.4 |
| 10 | 70.317 | 3.77 | — | — |
| 11 | −127.349 | 1.70 | 1.60311 | 60.7 |
| 12 | 63.789 | 4.51 | 1.80518 | 25.4 |

TABLE 3-continued

FNO = 1:5.7–5.7–5.7
f = 152.93–200.00–294.00 (Zoom Ratio: 1.92)
W = 12.9–9.8–6.6
fB = 91.44–100.18–116.94

| Surf. No. | r | d | Nd | $v_d$ |
|---|---|---|---|---|
| 13 | −1526.602 | 1.41 | — | — |
| 14 | −123.843 | 1.70 | 1.77250 | 49.6 |
| 15 | 328.908 | 45.17–28.85–3.99 | — | — |
| 16 | 978.530 | 2.67 | 1.58913 | 61.2 |
| 17 | −222.583 | 0.10 | — | — |
| 18 | 146.126 | 5.80 | 1.51633 | 64.1 |
| 19 | −65.168 | 1.70 | 1.74077 | 27.8 |
| 20 | −308.069 | 0.10 | — | — |
| 21 | 39.335 | 5.60 | 1.49700 | 81.6 |
| 22 | 126.463 | 8.33 | — | — |
| 23 | −15245.043 | 1.70 | 1.80518 | 25.4 |
| 24 | 352.526 | 25.71 | — | — |
| 25 | 138.810 | 3.00 | 1.80518 | 25.4 |
| 26 | −453.633 | 16.27 | — | — |
| 27 | −30.309 | 2.20 | 1.80610 | 40.9 |
| 28 | −56.218 | — | — | — |

Table 4 shows the numerical values of each condition for each embodiment.

TABLE 4

| | Embod. 1 | Embod. 2 | Embod. 3 |
|---|---|---|---|
| Cond. (1) | 1.033 | 1.020 | 1.060 |
| Cond. (2) | 1.187 | 1.474 | 1.122 |
| Cond. (3) | 1.188 | 1.388 | 1.113 |
| Cond. (4) | 1.226 | 1.504 | 1.190 |
| Cond. (5) | 0.646 | 0.708 | 0.674 |
| Cond. (6) | 0.110 | 0.090 | 0.119 |

As can be understood from Table 4, the first through third embodiments satisfy conditions (1) through (6). Furthermore, as can be understood from the aberration diagrams, the various aberrations are relatively well corrected.

According to the above description, a zoom lens system for use in a single lens reflex camera, which does not change the overall length of the zoom lens system upon both zooming and focusing, and which is compact and has a high optical performance, can be obtained.

What is claimed is:

1. A zoom lens system comprising a positive first lens group, a negative second lens group, and a positive third lens group, in this order from an object,
   wherein upon zooming from the short focal length extremity to the long focal length extremity, said positive first lens group remains stationary, said negative second lens group moves toward an image, and said positive third lens group moves toward the object; and
   wherein said positive first lens group comprises a first sub-lens group which is stationary and a second sub-lens group which functions as a focusing lens group.

2. The zoom lens system according to claim 1, satisfying the following conditions:

$1<|m2W|$ $1<|m3W|$ $1<Z2/Z3<2$ wherein
   m2W designates the lateral magnification of said negative second lens group at the short focal length extremity;
   m3W designates the lateral magnification of said positive third lens group at the short focal length extremity;

Z2 designates the ratio (m2T/m2W) of the lateral magnification (m2T) of said negative second lens group at the long focal length extremity to the lateral magnification (m2W) of said negative second lens group at the short focal length extremity; and Z3 designates the ratio (m3T/m3W) of the lateral magnification (m3T) of said positive third lens group at the long focal length extremity to the lateral magnification (m3W) of said positive third lens group at the short focal length extremity.

3. The zoom lens system according to claim 1, satisfying the following conditions:

$$1.0 < fw/f1 < 2.0$$

$$0.5 < fw/f1a < 1.0$$

wherein fw designates the focal length of the entire the zoom lens system at the short focal length extremity;

f1 designates the focal length of said positive first lens group; and f1a designates the focal length of said first sub-lens group.

4. The zoom lens system according to claim 1, satisfying the following condition:

$$0.05 < L1a/f1 < 0.15$$

wherein

L1a designates the distance between said first sub-lens group and said second sub-lens group when an object at an infinite distance is in an in-focus state.

5. The zoom lens system according to claim 1, wherein said first sub-lens group comprises a negative lens element and a positive lens element, in this order from said object; and wherein said second sub-lens group comprises a negative lens element and a positive lens element, in this order from said object.

6. The zoom lens system according to claim 5, wherein each of said two positive lens elements in said positive first lens group is made of a glass material having the Abbe number of more than 75.

\* \* \* \* \*